United States Patent Office 3,787,454
Patented Jan. 22, 1974

3,787,454
NOVEL 6α-FLUORO-16α,18-DIMETHYL-1,4-PREGNADIENE-3,20-DIONES
Ulrich Kerb, Rudolf Wiechert, Karl Petzoldt, Klaus Kieslich, and Karl Heinz Kolb, Berlin, West Germany, assignors to Schering Aktiengesellschaft, Berlin and Bergkamen, Germany
No Drawing. Filed Dec. 29, 1971, Ser. No. 213,711
Claims priority, application West Germany, Dec. 30, 1970,
P 20 64 859.3
Int. Cl. G07c 169/32
U.S. Cl. 260—397.45
13 Claims

ABSTRACT OF THE DISCLOSURE

6α - fluoro - 16α,18 - dimethyl - 1,4 - pregnadiene-3,20-diones of the formula

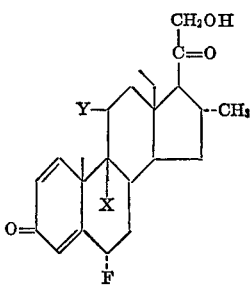

wherein X is a halogen atom and Y is a hydroxy group or a halogen atom having an atomic weight no greater than X, and physiologically acceptable 21-esters thereof, possessing anti-inflammatory activity, especially topical anti-inflammatory activity.

BACKGROUND OF THE INVENTION

This invention relates to novel 6α-fluoro-16α,18-dimethyl-1,4-pregnadiene-3,20-diones.

SUMMARY OF THE INVENTION

The novel compounds of this invention are 6α-fluoro-16α,18 - dimethyl - 1,4 - pregnadiene - 3,20 - diones of the formula

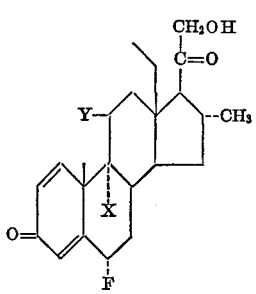

wherein X is a halogen atom and Y is a hydroxy group or a halogen atom having an atomic weight no greater than X, and physiologically acceptable 21-esters thereof.

In its process aspect, this invention relates to a process for the preparation of the novel 6α-fluoro-16α,18-dimethyl - 1,4 - pregnadiene - 3,20 - diones of Formula I and 21-esters thereof wherein halogen, hypochlorous acid or hypobromous acid is added to the Δ$^{9(11)}$-double bond of a 6α - fluoro - 16α,18 - dimethyl - 1,4,9(11) - pregnatriene-3,20-dione of the general Formula II

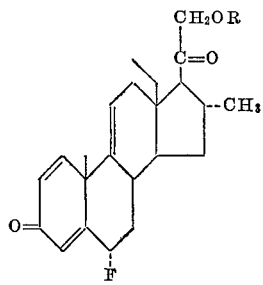

wherein R is OH or the acyl radical of an acid as defined herein, preferably organic carboxylic of 1–15 carbon atoms, preferably alkanoic and most preferably lower-alkanoic. The thus-formed 9α-chloro- or 9α-bromo-11β-hydroxy steroids of Formula I are optionally converted into the corresponding 9,11β-epoxides, and thereafter the epoxide ring is opened with hydrogen fluoride or hydrogen chloride and, if desired, an esterified 21-hydroxy group is saponified and then optionally again esterified to another 21-ester group.

DETAILED DISCUSSION

Suitable esters of this invention are esters of physiologically compatible acids. Preferred are esters of organic carboxylic acids of up to 15 carbon atoms, most preferably alkanoic acids, e.g., lower alkanoic, i.e., containing 1–6 carbon atoms.

It will be apparent to those skilled in the art that the exact nature of the ester group is not critical to the utility of the compounds of Formula I as anti-inflammatory agents and can thus be varied in a conventional manner without destroying the effectiveness of the parent 21-hydroxy compound. Thus, equivalents of the lower-alkanoic esters of this invention are esters otherwise correspondingly structurally thereto and possessing the same activity where instead of a 21-lower-alkanoyloxy ester group there is present at the 21-position an ester of another organic acid, e.g., a carboxylic acid containing up to 15 carbon atoms, especially lower (1–6) carbon atoms and intermediate (7–12) aliphatic carboxylic, preferably an alkanoic acid, which can be saturated or unsaturated, straight or branched. Examples of preferred alkanoic acids are formic, acetic, moponic, butyric, isobutyric, trimethylacetic, α-ethylbutyric, valeric, isovaleric, α-ethylvaleric, 2-methylbutyric, 3-ethylbutyric, hexanoic, diethylacetic, triethylacetic, caproic, enanthic, octanoic, undecylic, oleic and palmitic acid. Examples of equivalents of such acids are cyclic acids, preferably a cycloaliphatic acid, containing, e.g., 5–18 carbon atoms, e.g., cyclopropylidenacetic, cyclobutylcarboxylic, cyclopentylcarboxylic, cyclopentylacetic, cyclopentylpropionic, cyclohexyl, cyclohexylacetic and β - cyclohexylpropionic acid; a carbocyclic aryl or alkaryl acid, e.g., containing 6–18 carbon atoms, and 1 to 5, preferably 1 or 2 rings, e.g., benzoic, 2-   3-, or 4-methyl-benzoic, 2,3- 2,4-, 2,5-, 2,6-, 3,4-, and 3,5-dimethylbenzoic, ethylbenzoic, 2,3,6 - trimethylbenzoic, and 3 - methyl - α - naphthoic acid; an aralkyl acid, e.g., containing 7 to 18 carbon atoms, e.g., phenylacetic, β-phenylpropionic, a polybasic acid, e.g., containing 2–18 carbon atoms and 0 to 5 hydroxy groups, e.g., glycolic, lactic, succinic, adipic, citric, tartaric, d-maleic, d-glyceric, and salicylic acid; the corresponding acids containing one, two or more of substituents, e.g., halo, oxo, amino, alkoxy, acyloxy, etc., in the molecule, e.g., mono-, di- and trichloroacetic, fluoroacetic, trichloroacetic, trifluoroacetic, 2,3,4 - trimethoxybenzoic, phenoxyacetic, α-naphthoxyacetic acid, nicotinic acid, aminoacetic, lower-alkylaminoacetic, and dilower-alkylaminoacetic acids, e.g., ethylaminoacetic and diethylaminoacetic, O-, N- or S-heterocyclic substituted-alkanoic acids, e.g., piperidinoacetic and morpholinoacetic acid.

Also equivalents of the 21-lower-alkanoic esters of this invention are 21-esters of sulfonic acids, e.g., an arylsulfonic, including benzenesulfonic, p-toluene-sulfonic, m,m' - dimethylbenzenesulfonic, o,o' - dimethylbenzenesulfonic, sym.-trimethylbenzenesulfonic, sym.-triethylbenzenesulfonic, m-ethylbenzenesulfonic, para-isopropylbenzenesulfonic, m-n-butylbenzenesulfonic acid, or an alkylsulfonic, e.g., methanesulfonic, ethanesulfonic, propanesulfonic, isopropanesulfonic, butanesulfonic, tert.-butanesulfonic, pentanesulfonic, isopentanesulfonic, hexanesulfonic, heptanesulfonic, octylsulfonic or heterocyclic sulfonic, e.g., $\alpha$-pyridinesulfonic, $\alpha$-pyranesulfonic, $\alpha$-thiophenesulfonic, $\alpha$-furansulfonic, $\alpha$-tetrahydrofuransulfonic, or other alkyl-, carbocyclic and heterocyclic aryl-, alkaryl- and aralkyl-sulfonic acid, preferably one containing 1–8 carbon atoms and 0–2, preferably 0–1 N, S or O heteroatoms, which are preferably ring carbon atoms in a heterocyclic ring.

As is well known in the art, 21-esters of inorganic acids, such as, for example, sulfuric acid and phosphoric acid, also possess the anti-inflammatory activity of the parent 21-hydroxy steroids and are thus equivalents of the 21-hydroxy compound of this invention.

To produce water-soluble 21-esters, substituted aminoacylates, such as diethylamino, piperidino-, and morpholino-acetates, can be converted into the acid addition salts, and the sulfuric acid esters and phosphoric acid esters can be converted into the alkali metal salts.

The addition of halogen to the $\Delta^{9(11)}$-double bond of the compounds of Formula II can be achieved in a variety of ways. For example, a halogen, e.g., chlorine or bromine, or mixed halogen compounds, e.g., chlorine monofluoride or bromine monochloride, or halogen from a polyhalogenide, such as, for example, potassium triiodide or iodobenzene dichloride can be added directly to the double bond.

The addition of halogen is especially successful by treating the $\Delta^{9(11)}$-steroids simultaneously with both a positive halogen and a negative halogen. Reagents containing positive halogen are, for example, halogen succinimides, halogen acetamides and the halogens themselves Reagents which yield negative halogen are, for example, hydrogen halides, e.g., hydrogen chloride and hydrogen bromide, alkali metal halides, particularly lithium halides, e.g., lithium chloride and lithium bromide. The addition of positive and negative halogens to the $\Delta^{9(11)}$-double bond of the steroid always takes place so that the positively charged halogen is added to the 9-position and the negatively charged halogen is added to the 11-position of the molecule. Moreover, the atomic weight of the halogen in the 9-position can never be less than that of the halogen in the 11-position, due to the known, differing electro-negativity of the halogens. The halogen addition to the $\Delta^{9(11)}$-double bond is preferably conducted at temperatures of between −75° C. and +50° C.

The addition of hypochlorous or hypobromous acid to the $\Delta^{9(11)}$-double bond of the compounds can be conducted in accordance with operating methods generally known in the art. A preferred method is the treatment of the $\Delta^{9(11)}$-double bond with reagents which liberate hypochlorous or hypobromous acids in the presence of water and in an acidic reaction medium during the course of the reaction, e.g., with reagents forming halogen cations, such as, e.g., dibromomethylhydantoin, N-haloacylamides, especially N-chloro- or N-bromoacetamide, or N-haloacylimides, in particular N-bromo- or N-chlorosuccinimide.

If the desired final products of the process are 9α-fluoro compounds, then, after the addition of hypohalogenite to the 9,11-double bond, in a likewise conventional manner, the 9α-bromo- (or -chloro-) 11β-hydroxy group is closed to the 9,11 β-epoxy ring, for example by treatment with a basic reagent, e.g., NaOH, KOH, $K_2CO_3$, potassium acetate and pyridine, preferably at an elevated reaction temperature. This oxido ring is then thereafter converted into the 11β-hydroxy-9α-fluoro group by means of hydrofluoric acid. In the same manner, it is possible, if desired, to convert the 9α-bromo-11β-hydroxy steroids of Formulas I into the 9α-chloro-11β-hydroxy steroids, by opening the epoxide ring with hydrogen chloride instead of hydrogen fluoride.

The esterification of free 21-hydroxy groups can be conducted in accordance with conventional methods, e.g., by treating the 21-hydroxy steroids with an acid anhydride or acid halogenide in the presence of a basic catalyst, e.g., pyridine, lutidine, aqueous sodium bicarbonate solution, etc.

The novel compounds exhibit excellent anti-inflammatory activity, as evidenced by topical application in the vasoconstriction test on experimentally hyperemized human skin. They are suitable, in combination with the customary excipients in galenic pharmacy, for the treatment of, for example:

(a) topical: contact dermatitis, erythrodermia, first-degree burns, pruritus vulvae et ani, rosacea, erythematodes cutaneus, psoriasis, lichen ruber planus et verrucosus;

(b) oral: acute and chronic polyarthritis, neurodermitis, bronchial asthma, hay fever, etc.

The specific drugs are prepared in the usual manner by converting the effective agents, together with pharmaceutically acceptable additives, carriers and flavoring agents, into the desired forms of application, such as tablets, dragees, capsules, solutions, ointments, etc. The concentration of effective agent in the thus-formulated drugs is dependent on the form of administration.

The compounds can be employed in the treatment of inflammatory conditions formulated in conventional pharmaceutically acceptable carriers in the forms customarily employed in pharmaceuticals. For oral administration, especially suitable are tablets, dragees, capsules, pills, suspensions and solutions. Suitable excipients for tablets are, for example, lactose, amylose, talc, gelatin, magnesium stearate, and the like.

For topical administration, suitable are powders, solutions, suspensions, aerosols, and vaginal suppositores, For parenteral application, aqueous and oily solutions or suspensions can be employed.

The compounds of this invention are formulated so as to provide, for example 5 to 50 mg. of the effective agent in admixture with 50 mg. to 5.0 g. of a pharmacologically indifferent excipient, i.e., a pharmaceutically acceptable carrier, per unit, dosage, e.g., per tablet.

The novel effective agents are usually administered topically at concentrations in the pharmaceutical carrier of between 0.01 and 1.0%, preferably 0.05 to 0.50%.

Without further elaboration, it is believed that one skilled in the art can, using the preceding description, utilize the present invention to its fullest exent. The following preferred specific embodiments are, therefore, to be construed as merely illustrative, and not limitative of the remainder of the disclosure in any way whatsoever.

Preparation

17β-hydroxy-18-methyl-5(10)-estren-3-one is reduced in tetrahydrofuran at room temperature and under a pressure of 200 atmospheres with hydrogen and freshly prepared Raney nickel, thus producing 18-methyl-5(10)-estrene-3β,17β-diol, M.P. 165–166° C.

The latter compound is treated, in dimethoxyethane-diethyl ether at 50° C., with methyl iodide in the presence of zinc-copper, thus producing 18-methyl-5,10β-methylene-estrane-3β,17β-diol, M.P. 116–117.5° C., which latter is oxidized, in acetone with aqueous chromic anhydride/sulfuric acid, to 18-methyl-5,10β-methylene-estrane-3,17-dione, M.P. 142–143.5° C.

The thus-produced dione is heated in glacial acetic acid with concentrated hydrochloric acid to 80° C., thus producing 18-methyl-4-androstene-3,17-dione, M.P. 141–142° C., which latter compound is isomerized by treatment with potassium tert.-butylate in tetrahydrofuran at 0° C. to 18-methyl-5-androstene-3,17-dione.

The last-mentioned compound is reduced with lithium tri-tert.-butoxyhydride, at room temperature, in tetrahydrofuran, to 3β-hydroxy-18-methyl-5-androsten-17-one, M.P. 166–168° C.

The thus-obtained 3β-hydroxy steroid is ethinylated with lithium acetylide in ethylenediamine and then acetylated with acetic anhydride-pyridine, thus producing 3β-acetoxy-18-methyl-17α-ethinyl-5-androsten-17β-ol, M.P. 60–62° C., which is converted by heating with phosphorus oxychloride in lutidine to 100° C. to 3β-acetoxy-18-methyl-5,16-pregnadien-20-yne, M.P. 86.5–87.5° C.

The thus-produced pregnadiene is reacted in methanol at 0° C. with mercury(II) acetate and boron trifluoride etherate, to produce 3β-acetoxy-18-methyl-5,16-pregnadien-20-one, M.P. 129.5–130.5° C.

The latter compound is methylated in tetrahydrofuran-ether at 0° C. with methylmagnesium iodide in the presence of copper(I) chloride thus producing 3β-hydroxy-16α,18-dimethyl-5-pregnen-20-one, M.P. 167–170° C.

The 16α-methyl compound is reacted in methylene chloride with the diethyl ester of oxalic acid and sodium methylate at 60° C. The product of this reaction is isolated as the crude compound and reacted at −20° C. with a methanolic iodine solution, and then treated with sodium methylate, thus obtaining 21-iodo-3β-hydroxy-16α,18-dimethyl-5-pregnen-20-one which is converted, by heating with potassium acetate in acetone under reflux, to 3β - hydroxy-21-acetoxy-16α,18-dimethyl-5-pregnen-20-one, M.P. 137.5–138.5° C.

The thus-produced 3β-hydroxy-21-acetoxy-16α,18-dimethyl-5-pregnen-20-one, dissolved in methylene chloride, is introduced into a solution of hydrogen fluoride and N-bromosuccinimide in dimethylformamide cooled to −10° C. The product thus-obtained is 6β-fluoro-5α-bromo-3β-hydroxy - 21 - acetoxy-16α,18-dimethyl-pregnan-20-one, M.P. 139–140° C.

The last-mentioned compound is oxidized in acetone with aqueous chromic anhydride/sulfuric acid and the oxidation product is isolated in the crude form and thereafter treated with sodium acetate in glacial acetic acid, thus producing 6α-fluoro-21-acetoxy-16α,18-dimethyl-4-pregnene-3,20-dione, M.P. 138.5–140° C.

The 6α-fluoro compound is hydroxylated under the usual fermentation conditions with a culture of *Aspergillus ochraceus*, thus obtaining 6α-fluoro-11α,21-dihydroxy-16α,18 - dimethyl-4-pregnene-3,20-dione, M.P. 232–235° C., and the latter compound is dehydrogenated with *Bacillus lentus*, thus producing 6α-fluoro-11α,21-dihydroxy - 16α,18 - dimethyl - 1,4-pregnadiene-3,20-dione, M.P. 228–230° C.

The pregnadiene obtained in this manner is reacted in dimethylformamide with acetic anhydride and lead(II) acetate, thus producing 6α-fluoro-11α-hydroxy-21-acetoxy-16α,18-dimethyl-1,4-pregnadiene-3,20-dione.

The last-mentioned compound is dissolved as the crude product in pyridine, treated with methanesulfonic acid chloride, and thus 6α-fluoro-11α-mesyloxy-21-acetoxy-16α,18 - dimethyl - 1,4 - pregnadiene-3,20-dione is obtained which is refluxed in glacial acetic acid with sodium acetate to produce 6α-fluoro-16α,18-dimethyl-1,4,9(11)-21-acetoxy-pregnatriene-3,20-dione.

To prepare compounds of the general Formula II bearing, in the 21-position, acyl residues other than acetyl, in the 21-esterification step described above, the acid chloride or acid anhydride of the desired esterifying acid is employed instead of acetic anhydride for the acylation of the 21-hydroxy group.

EXAMPLE 1

187 mg. of 6α-fluoro-21-acetoxy-16α,18-dimethyl-1,4,9(11)-pregnatriene-3,20-dione is dissolved in 7 ml. of tetrahydrofuran, mixed with 600 mg. of N-chlorosuccinimide and 5.3 ml. of 1 N aqueous perchloric acid, and agitated for two and one-half hours at 35° C. Then, the mixture is concentrated at 30° C. under vacuum, the residue is mixed with methylene chloride, the methylene chloride phase is washed with water, dried, and concentrated under vacuum. The residue is chromatographed by preparative thin-layer chromatography on silica gel by means of acetone-chloroform (95+5), thus obtained 6α-fluoro - 9α - chloro - 11β - hydroxy-21-acetoxy-16α,18-dimethyl-1,4-pregnadiene-3,20-dione, having a point of decomposition of 203.5–204.5° C. (recrystallized from acetone-diisopropyl ether).

EXAMPLE 2

110 mg. of 6α-fluoro-21-acetoxy-16α,18-dimethyl-1,4,9(11)-pregnatriene-3,20-dione is dissolved in 2 ml. of tetrahydrofuran, mixed with 0.9 ml. of 1 N aqueous perchloric acid and 143 mg. of N-bromosuccinimide, and stirred for 30 minutes at 30° C. Then, the mixture is poured into water, the precipitate is vacuum-filtered, dissolved in methylene chloride, the methylene chloride phase is washed with water, dried, concentrated under vacuum, and the product thus obtained is 6α-fluoro-9α-bromo - 11β - hydroxy - 21 - acetoxy-16α,18-dimethyl-1,4-pregnadiene-3,20-dione as the crude compound.

This crude product is heated under reflux for one hour in 5 ml. of ethanol and 220 mg. of potassium acetate. The mixture is allowed to cool, then diluted with methylene chloride, the methylene chloride phase is washed with water, dried, and concentrated under vacuum, thus obtaining 6α - fluoro - 21 - acetoxy-9,11β-epoxy-16α,18-dimethyl-1,4-pregnadiene-3,20-dione as the crude product.

The thus-obtained epoxide is dissolved in 1 ml. of dimethylformamide, and the solution is added dropwise to a mixture, cooled to −10° C., of 2 ml. of dimethylformamide and 2 ml. of hydrogen fluoride. Then, the reaction solution is stored at room temperature for 24 hours and thereafter stirred into ammonia-alkaline ice water. The thus-precipitated product is vacuum-filtered, washed with water, dried under vacuum, and the compound thus produced is 6α,9α-difluoro-11β-hydroxy-21-acetoxy-16α,18-dimethyl-1,4-pregnadiene-3,20-dione, M.P. 142–144° C. (recrystallized from acetone-hexane).

EXAMPLE 3

190 mg. of 6α-fluoro-9α-chloro-11β-hydroxy-21-acetoxy-16α,18-dimethyl - 1,4 - pregnadiene-3,20-dione is suspended in 2 ml. of methylene chloride and 2 ml. of methanol, and the suspension is mixed under ice cooling with a solution of 12 mg. of potassium hydroxide in 0.4 ml. of methanol and agitated for 10 minutes at 0° C. Then, the mixture is neutralized with acetic acid, diluted with methylene chloride, the methylene chloride phase washed with water, dried, and concentrated under vacuum. The residue is triturated with hexane, dried, and 120 mg. of 6α-fluoro-9α-chloro - 11β,21 - dihydroxy - 16α,18 - dimethyl-1,4-pregnadiene-3,20-dione is obtained as an amorphous powder.

EXAMPLE 4

170 mg. of 6α,9α-difluoro - 11β - hydroxy-21-acetoxy-16α,18-dimethyl-1,4-pregnadiene-3,20-dione is saponified under the conditions of Example 3, thus producing 6α,9α-difluoro-11β,21-dihydroxy-16α,18-dimethyl - 1,4 - pregnadiene-3,20-dione.

EXAMPLE 5

500 mg. of 6α-fluoro-21-acetoxy-16α,18-dimethyl-1,4,9(11)-pregnatriene-3,20-dione is dissolved in 20 ml. of glacial acetic acid, mixed with 2 g. of lithium chloride, and cooled to 0° C. Then, the mixture is mixed with a solution of 198 mg. of N-chlorosuccinimide and 52 mg. of hydrogen chloride in 0.5 ml. of tetrahydrofuran, and this mixture is agitated for four and one-half hours at room temperature and then poured into ice water. The thus-separated product is vacuum-filtered, dissolved in methylene chloride, the methylene chloride solution washed with water, and concentrated under vacuum. The residue is recrystallized from ether-pentane, thus obtaining 6α-fluoro-9α,11β-dichloro-21-acetoxy-16α,18-dimethyl-1,4-pregnadiene-3,20-dione, M.P. 212–213° C.

EXAMPLE 6

800 mg. of 6α,9α-difluoro-11β,21-dihydroxy-16α,18-dimethyl-1,4-pregnadiene-3,20-dione is dissolved in 8 ml. of pyridine, the solution is cooled to −10° C., mixed dropwise with 0.96 ml. of isobutyric acid chloride, and stored for 60 hours at +5° C. Then, the mixture is poured into ice water, the thus-separated product is vacuum-filtered, washed in water, dried under vacuum, and dissolved in methylene chloride. After the addition of diisopropyl ether to the methylene chloride solution, the 6α,9α-difluoro-11β-hydroxy-21-isobutyryloxy - 16α,18 - dimethyl-1,4-pregnadiene-3,20-dione is crystallized therefrom; M.P. 160–162° C.

EXAMPLE 7

1.6 g. of 6α-fluoro-9α-chloro-11β,21-dihydroxy-16α,18-dimethyl-1,4-pregnadiene-3,20-dione is mixed with 10 ml. of pyridine and 2.6 g. of undecylic acid anhydride, stored at room temperature for 48 hours, and worked up as described in Example 6, thus obtaining 1.2 g. of 6α-fluoro-9α - chloro - 11β - hydroxy - 21 - undecyloxy - 16α,18-dimethyl - 1,4 - pregnadiene - 3,20 - dione in the form of an oil. $\epsilon_{238}=15{,}900$.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. 6α - fluoro - 16α,18 - dimethyl-1,4-pregnadiene-3,20-diones of the formula

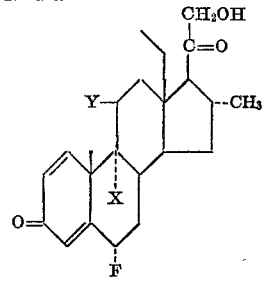

wherein X is a halogen atom and Y is a hydroxy group or a halogen atom having an atomic weight no greater than X, and physiologically acceptable 21-esters thereof of aliphatic carboxylic acids of 1–15 carbon atoms.

2. A compounds of claim 1 wherein X is Cl or F and Y is a hydroxy group.

3. A compound of claim 1 wherein X is Cl or F and Y is a halogen atom.

4. A compound of claim 1, 6α-fluoro-9α-chloro-11β-hydroxy - 21 - acetoxy - 16α,18 - dimethyl - 1,4 - pregnadiene-3,20-dione.

5. A compound of claim 1, 6α-fluoro-9α-bromo-11β-hydroxy-21-acetoxy - 16α,18 - dimethyl - 1,4 - pregnadiene-3,20-dione.

6. A compound of claim 1, 6α,9α-difluoro-11β-hydroxy-21 - acetoxy - 16α,18 - dimethyl - 1,4 - pregnadiene-3,20-dione.

7. A compound of claim 1, 6α-fluoro-9α-chloro-11β,21-dihydroxy-16α,18-dimethyl-1,4-pregnadiene-3,20-dione.

8. A compound of claim 1, 6α,9α-difluoro-11β,21-dihydroxy-16α,18-dimethyl-1,4-pregnadiene-3,20-dione.

9. A compound of claim 1, 6α-fluoro-9α,11β-dichloro-21-acetoxy-16α,18-dimethyl-1,4-pregnadiene-3,20-dione.

10. A compound of claim 1, 6α,9α-difluoro-11β-hydroxy - 21 - isobutyryloxy - 16α,18 - dimethyl - 1,4 - pregnadiene-3,20-dione.

11. A compound of claim 1, 6α-fluoro-9α-chloro-11β-hydroxy-21-undecyloxy - 16α,18 - dimethyl - 1,4 - pregnadiene-3,20-dione.

12. A compound of claim 1, 6α-fluoro-11α-hydroxy-21-acetoxy-16α,18-dimethyl-1,4-pregnadiene-3,20-dione.

13. An alkanoic acid ester of claim 1.

References Cited
UNITED STATES PATENTS
3,426,128    2/1969    Kieslich et al. ____ 260—397.45

ELBERT L. ROBERTS, Primary Examiner

U.S. Cl. X.R.
424—243; 260—397.3, 397.4, 397.5, 397.47